A. JACKSON.
CANDY CUTTING MACHINE.
APPLICATION FILED OCT. 30, 1909.

1,019,793.

Patented Mar. 12, 1912.
3 SHEETS—SHEET 3.

Witnesses
R. C. Claflin
Lola M. Gillespie

Inventor
Alfred Jackson
Alex. J. Wedderburn, Jr.
Attorney

UNITED STATES PATENT OFFICE.

ALFRED JACKSON, OF PHILADELPHIA, PENNSYLVANIA.

CANDY-CUTTING MACHINE.

1,019,793. Specification of Letters Patent. Patented Mar. 12, 1912.

Application filed October 30, 1909. Serial No. 525,576.

*To all whom it may concern:*

Be it known that I, ALFRED JACKSON, citizen of the United States, residing at Philadelphia, in the county of Philadelphia and State of Pennsylvania, have invented certain new and useful Improvements in Candy-Cutting Machines, of which the following is a specification.

This invention relates to improvements in candy cutting machines and embraces the construction of a candy cutting machine having means for guiding the candy cutting board.

Figure 1:
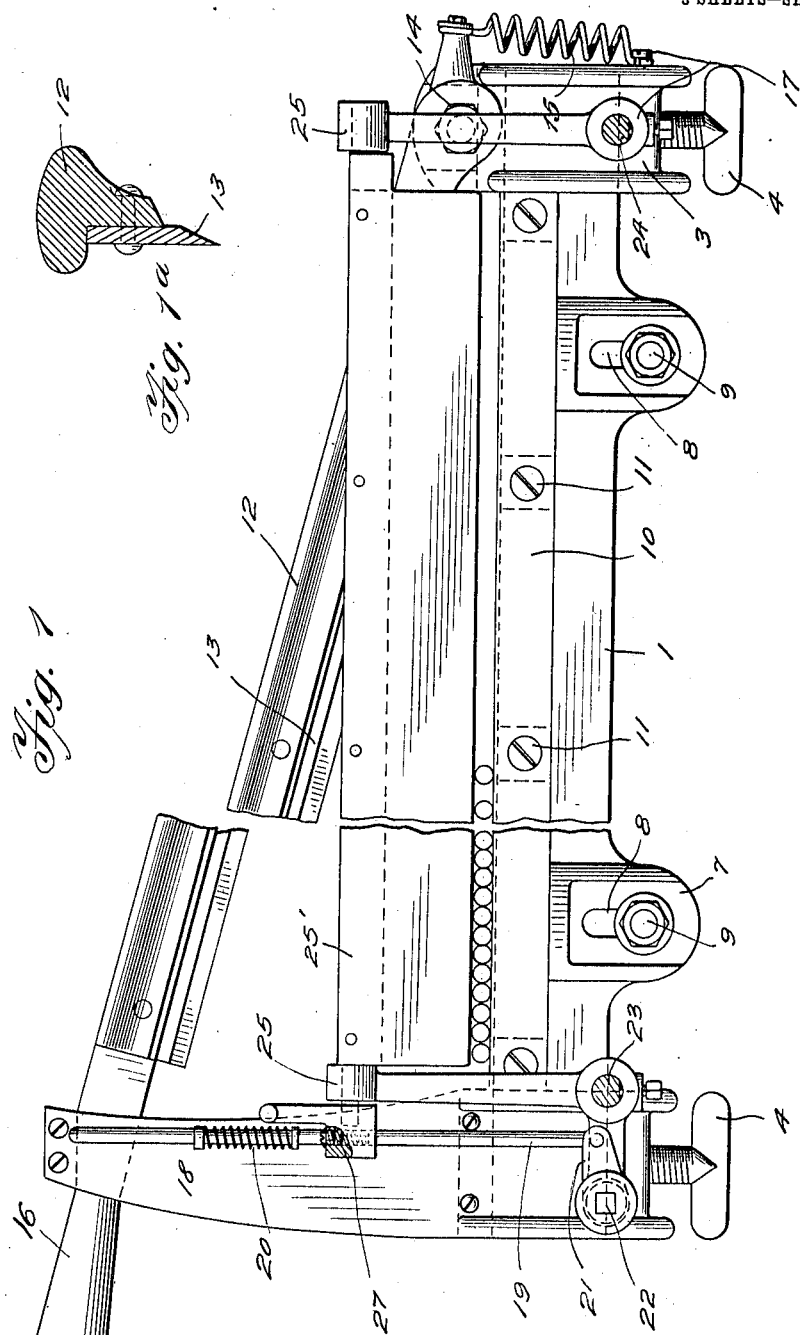
Figure 2:
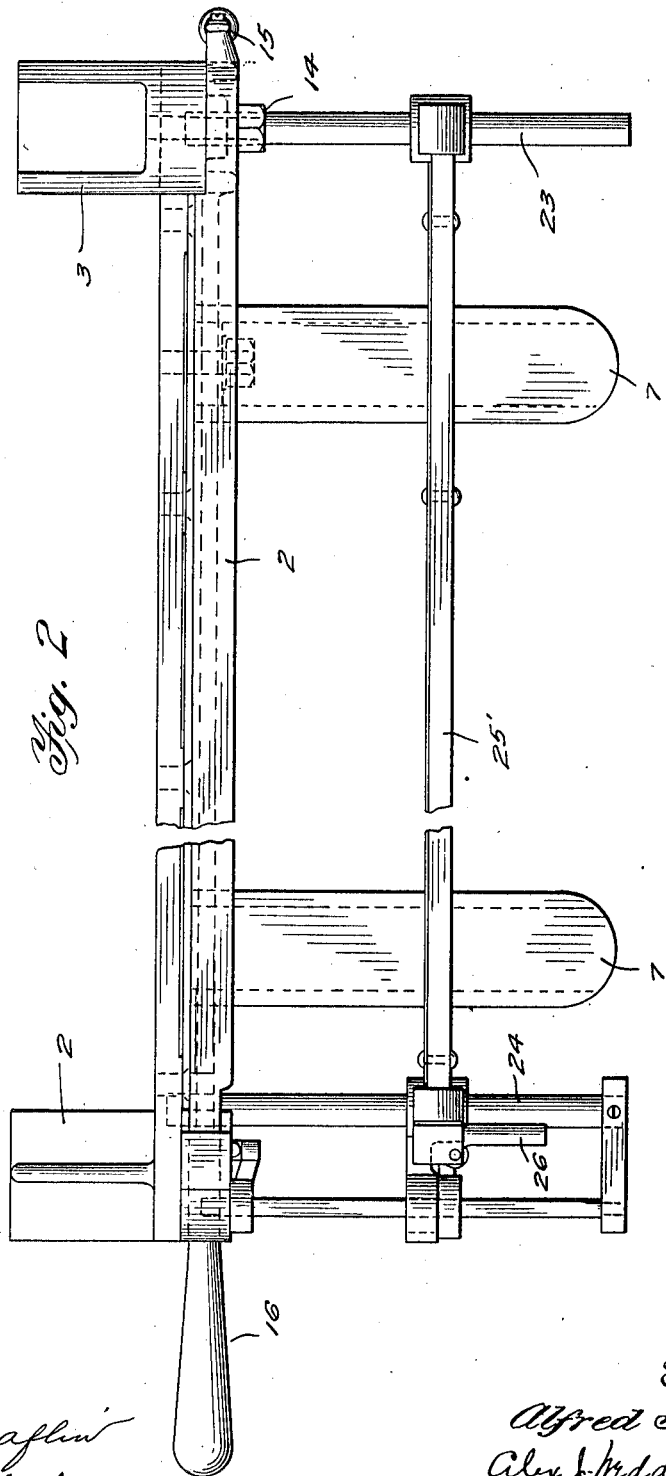
Figure 3:
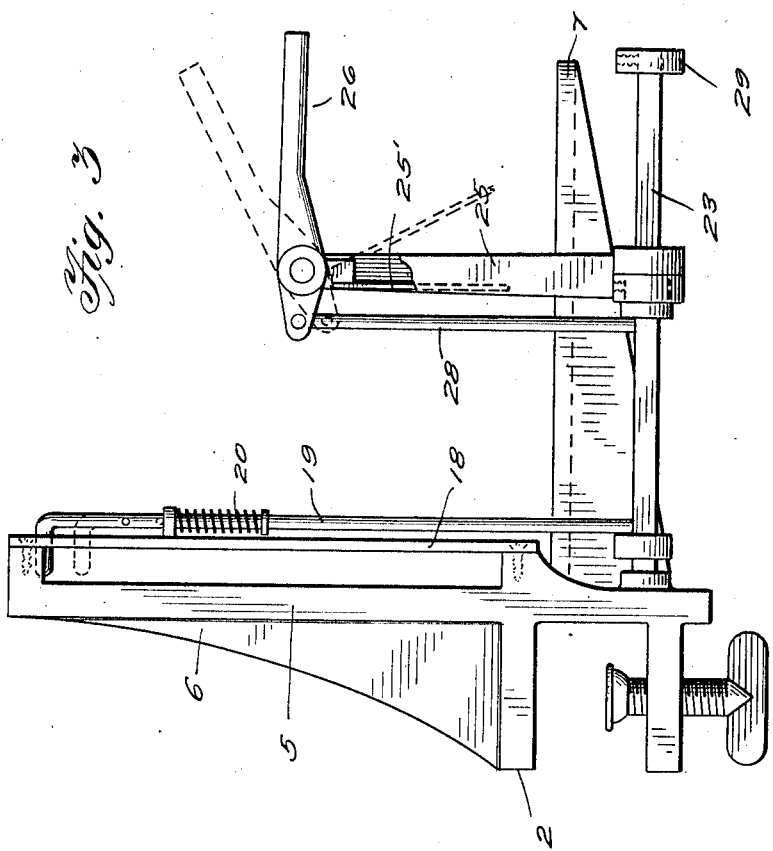

One of the objects of the invention is the construction of a candy cutting machine having a movable stop whereby candy in trays and in the form of bars or rolls or strips may be moved against the stop so that fixed lengths of the candy may be cut.
Another object of the invention is the construction of a candy cutting machine having an improved cutting knife and means for holding candy trays in position for the knife to act on the candy in the trays.
With the above and other objects in view the invention embraces certain constructions, combinations and arrangements of parts, clearly described in the following specification and clearly illustrated in the accompanying drawings, in which, Figure 1 is a side elevation with the stop removed, Fig. 1ª is a detail transverse sectional view of the cutter, Fig. 2 is a plan view, and Fig. 3 is an end view with the cutter removed.

Referring to the accompanying drawings, which are merely illustrative of the invention, 1 denotes a frame which is formed with spaced table engaging U-shaped members 2 and 3, which members carry clamping screws 4, whereby the device may be readily secured to a table.

Above the frame a support or standard 5 is located, said standard or support being provided with a web 6, whereby the same is strengthened.

The frame 1 is provided with two spaced tray supporting members 7, each of which is formed with slots 8 and adjustably secured by means of screws or bolts 9, extending through said slots, to the frame 1.

On the frame 1 a base cutting member 10 is secured by screws 11. On the end of the frame adjacent the holding member 3 a cutting member 12, having a knife 13 secured thereto, is pivoted by means of a bolt 14.
The rear end of the cutting member 12 projects outwardly of the pivot bolt 14 and is connected to a contraction spring 15, adapted to hold the handle 16 of the cutting member 12 uppermost above the frame 1. The spring 15 is connected at 17 to the frame 1. The handle 16 projects beyond the support or standard 5 and is slidable between the support 5 and a plate 18, which is secured to said support.

The cutting member 12 is prevented from making a sharp contact with the upper end of the support 5 by means of a spring rod 19, having a spring 20 thereon, which rod has its upper end bent at right angles and is adapted to be engaged by the handle 16 of the cutting member 12, whereby the spring 20 of the rod 19 is compressed and the upward force of the spring thrown or raised cutting member is broken or absorbed. The rod 19 is connected at its lower end to an arm 21, which is secured to a shaft 22. The cutting blade or knife 13 of the cutting member 12 is formed in sections, each section being adapted to enter a candy tray so as to engage with the bottom of the tray.

Two holding rods 23 and 24 are secured to the frame 1, and on said rods bearing supports 25 are mounted. On the bearing supports 25 a movable stop or apron 25', is journaled, said stop or apron being adapted to be rocked on the supports 25 by means of a handle 26, which is suitably secured thereto, said handle being engaged by a spring 27, and being connected to a depending rod 28, forming an abutment or stop for the handle 26. The rod 28 is connected to a crank 28' secured to the shaft 22. The supports 25 are slidable on the rods 23 and 24 and are adapted to engage with stops 29, secured to the outer ends of the rods 23 and 24.

The material to be cut is moved by the hand of the operator against the apron 25, which gages the length of the material to be cut, then the handle 6 is pushed down, which action allows the rod 19 to be lowered at the same time by the action of the compressed spring 20. This motion is transmitted to the lever 21, and to shaft 22, which lowers the rod 28, causing the apron or stop 25' to open to the position shown in dotted lines in Fig. 3. In case of any bar of candy or material slipping out of place lever 26 can be pushed down to regage the material, regardless of what position the knife is in. The spring 15, shown in Fig. 2, returns the knife to its upper position and maintains it there.

Having described my invention I claim:—

1. In a candy cutting machine, a frame, a cutting member pivoted for operation thereon, a spring for holding the cutting member above the frame, and a resilient abutment rod for the cutting member.

2. In a candy cutting machine, a frame, a cutting member pivoted for action thereon, a rocking guide stop adjustable on the frame, and adjustable tray supporting means on the frame.

3. In a candy cutting machine, a frame, a cutting member pivoted for action on the frame, tray supporting arms formed with slots, means for adjustably holding the tray supporting arms on the frame, and a rocking stop guide secured on the frame.

4. In a candy cutting machine, a frame, means on the frame for securing the same to a table, a cutting member pivoted on the frame, spring means holding the cutting member above the frame, a spring buffer rod for the cutting member, supporting bearings on the frame, a stop guide journaled on the supporting bearings and a handle spring controlled on the stop guide.

5. In a candy machine, a frame, a knife working on the frame, a rod adapted to be engaged by the knife on reaching the limit of its upper stroke, a stop operating on the frame, and means connecting the rod to the frame.

6. In a candy machine, a frame, a knife working thereon, a resilient rod adapted to be engaged by the knife on reaching the limit of its upper stroke, a stop, and means connecting the stop to the rod.

7. In a candy machine, a frame, a knife working thereon, a resilient rod on the frame adapted to be engaged by the knife on reaching the limit of its upper stroke and a swinging stop coöperating with the rod.

8. In a candy machine, a frame, a knife working thereon, a resilient abutment rod on the frame, a knife engaging the abutment rod, a shaft connected with the rod, a rod connected with the shaft and a swinging stop connected with the last rod.

9. In a candy cutting machine, a frame, a knife working on the frame, a resilient abutment rod adapted to be engaged by the knife, a shaft connected with the rod, a rod connected with the shaft, a stop on the frame and a handle for the stop engaging the upper end of the last rod.

10. In a candy machine, a frame, a knife working thereon, a resilient abutment rod adapted to be engaged by the knife, a shaft connected with the abutment rod, a rod connected with the shaft, a stop, a support for the stop, said stop being adjustable on the shaft and the support, and a handle for the stop engaging the last rod.

11. In a candy machine, a frame, a spring elevated knife working thereon, a swinging stop, and resilient means connecting the stop to the knife, whereby the stop is rocked when the knife reaches the limit of its upper stroke.

12. In a candy machine, a frame, a spring elevated knife working thereon, a swinging stop, and a resilient abutment rod for the knife.

In testimony whereof I affix my signature, in presence of two witnesses.

ALFRED JACKSON.

Witnesses:
THOMAS SULLIVAN,
DANIEL W. HOLLOWAY.

Copies of this patent may be obtained for five cents each, by addressing the "Commissioner of Patents, Washington, D. C."